UNITED STATES PATENT OFFICE.

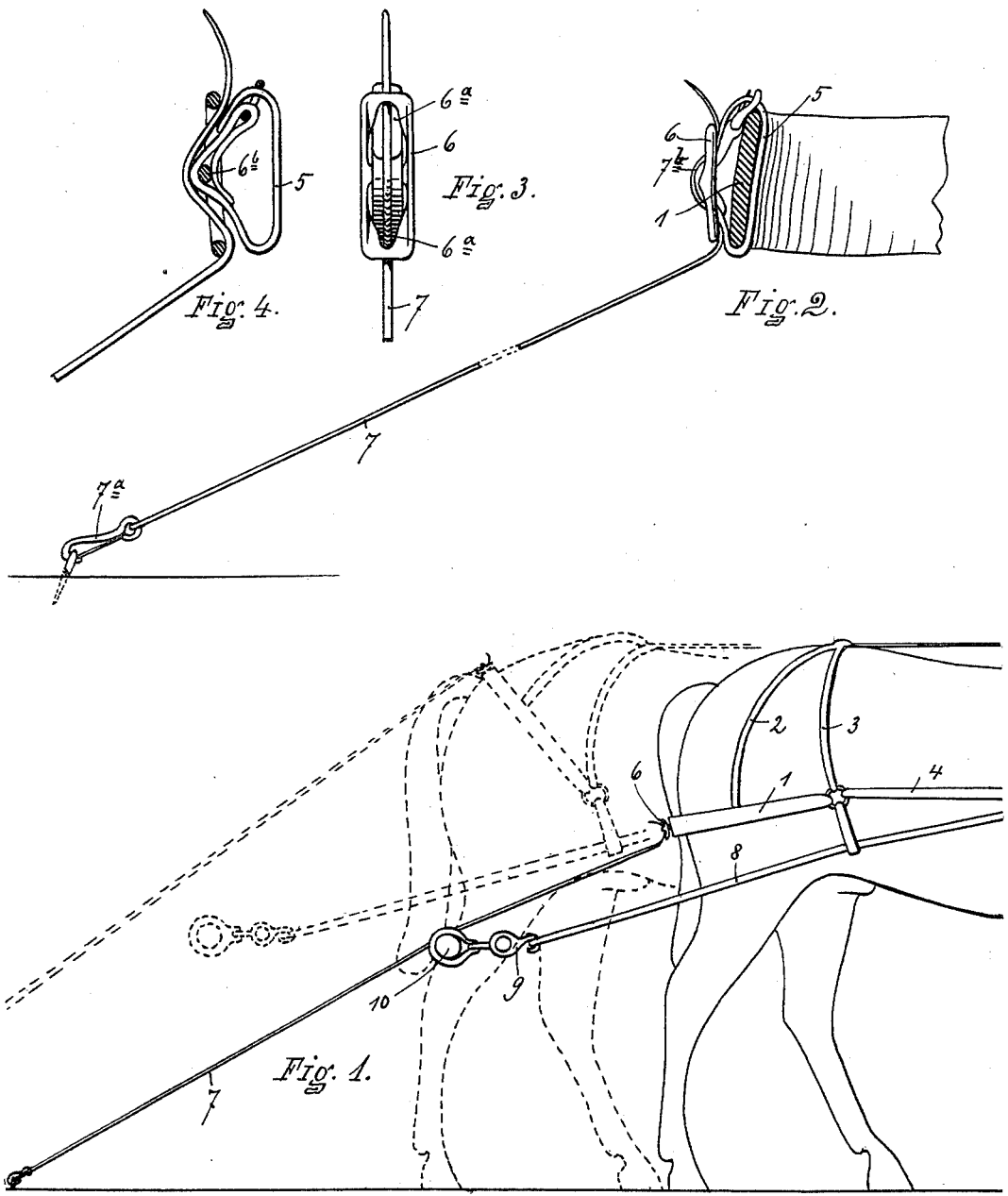

SK LE ROY CHUBBUCK, OF UTICA, NEW YORK, ASSIGNOR TO WILLIAM B. CROUSE, OF SAME PLACE.

HARNESS-ADJUSTER.

SPECIFICATION forming part of Letters Patent No. 600,573, dated March 15, 1898.

Application filed August 6, 1896. Serial No. 601,904. (No model.)

*To all whom it may concern:*

Be it known that I, SK LE ROY CHUBBUCK, of Utica, in the county of Oneida and State of New York, have invented certain new and useful Improvements in Harness-Adjusters; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to improvements in fire-department-harness adjusters.

In the drawings, Figure 1 shows my improved harness-adjuster applied and in operation. Fig. 2 shows details of the construction on side elevation. Fig. 3 shows a rear view of the parts of my device. Fig. 4 shows the same on a vertical section.

Referring to the reference-numbers in a more particular description of the device, 1 indicates the breeching-strap of the harness, which is supported by straps 2 3, passing over the rump of the horse in the usual manner. To the breeching-strap 1 is attached the holdback-straps 4 on either side. In fire-harnesses the harness is supported by catches which drop it onto the horse's back when the horse takes its position beneath the harness and the breeching-strap 1 is inclined to catch on the horse's rump, as shown in dotted lines in Fig. 1, and means are required to bring it into operative position, as shown in full lines in the same figure. For this purpose I provide, attached to the middle of the rear of the breeching-strap by means of a small strap 5, surrounding the breeching-strap, a clasp or holder 6. This clasp or holder 6 is provided with openings with U-shaped curves 6ª at either end and is supported by the strap 5, which engages on the cross-bar 6ᵇ of the holder.

In connection with this harness attachment is employed a round strap or line 7, adapted to be attached to a staple in the floor by a snap 7ª at one end and preferably having a tapering end 7ᵇ at the other end.

Referring again to Fig. 1, 8 indicates the traces, which are attached to the whiffletree 9, attached to the evener 10; and when the harness is supported in position for immediate use by hangers from the ceiling or otherwise the cord or connecting-strap 7 is attached to the floor by means of a staple and attached to the harness by being passed in and out through the holder 6 on the breeching-strap. After the harness has been dropped onto the horse and the horse starts forward the breeching-strap is drawn down into proper position by the pull on the strap or line 7. When the tension is sufficient and after the strap has been brought into position, the floor connection 7 is drawn out from the holder by the continued forward movement of the horse. When the harness is replaced in suspended position, the strap or floor connection 7 is reengaged with the holder 6, as shown in Figs. 2, 3, and 4, ready for a succeeding operation.

This device is particularly useful in hitching a three-horse team, where it is difficult for the driver to adjust the breeching-strap of the middle horse.

What I claim as new, and desire to secure by Letters Patent, is—

In a harness-adjuster the combination with the breeching of a frictional holder for the breeching-strap and a floor connection frictionally secured to the breeching-strap by the holder, substantially as set forth.

In witness whereof I have affixed my signature in presence of two witnesses.

SK LE ROY CHUBBUCK.

Witnesses:
D. W. PERKINS,
W. D. WILLIAMS.